United States Patent
Hirata et al.

(10) Patent No.: US 10,066,802 B2
(45) Date of Patent: *Sep. 4, 2018

(54) VEHICULAR LIGHTING APPARATUS

(71) Applicant: MAXELL, LTD., Kyoto (JP)

(72) Inventors: Koji Hirata, Osaka (JP); Masahiko Yatsu, Osaka (JP); Hiroyuki Kajikawa, Osaka (JP); Hiroyuki Nakamura, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/501,349

(22) PCT Filed: Sep. 30, 2014

(86) PCT No.: PCT/JP2014/076036
§ 371 (c)(1),
(2) Date: Feb. 2, 2017

(87) PCT Pub. No.: WO2016/051490
PCT Pub. Date: Apr. 7, 2016

(65) Prior Publication Data
US 2017/0227182 A1    Aug. 10, 2017

(51) Int. Cl.
*F21S 41/24* (2018.01)
*F21S 8/10* (2006.01)
(Continued)

(52) U.S. Cl.
CPC ............. *F21S 41/24* (2018.01); *F21S 41/141* (2018.01); *F21S 41/25* (2018.01); *F21S 41/32* (2018.01);
(Continued)

(58) Field of Classification Search
CPC .. G03B 21/14; G03B 21/145; G03B 21/2046; G03B 21/2066; F21S 48/115;
(Continued)

(56) References Cited

U.S. PATENT DOCUMENTS 7,581,860 B2    9/2009 Bogner et al.
9,714,754 B2    7/2017 Springer et al.
(Continued)

FOREIGN PATENT DOCUMENTS

EP    2372234 A2    10/2011
JP    2006-521667 A    9/2006
(Continued)

OTHER PUBLICATIONS

International Search Report for WO 20161051490 A1, dated Dec. 9, 2014.
(Continued)

*Primary Examiner* — Sultan Chowdhury
(74) *Attorney, Agent, or Firm* — Volpe and Koenig, P.C.

(57) ABSTRACT

A vehicular lighting apparatus that is relatively small, low cost, superior in mountability, and offers a superior design. The vehicular lighting apparatus may include a composite lens element that is a light guide element constructed by molding a translucent resin substantially into a plate-like shape; a planar light-emitting unit that emits illumination light; an optical system that transforms planar light from the light-emitting unit into linear light and that causes the linear transformed light to be incident on a rear side face of the light guide element; and a diffraction lens formed on the rear side face of the light guide element on which the linear transformed light is incident, and condensing the linear transformed light. The light condensed by the lens means is emitted from a front side face of the light guide element onto a road surface in front of the vehicle.

11 Claims, 17 Drawing Sheets

(51) Int. Cl.
*G03B 29/00* (2006.01)
*G03B 21/20* (2006.01)
*F21S 41/25* (2018.01)
*F21S 41/141* (2018.01)
*F21S 41/32* (2018.01)
*F21W 101/10* (2006.01)
*F21Y 115/10* (2016.01)
*F21Y 105/10* (2016.01)
*F21W 102/00* (2018.01)

(52) U.S. Cl.
CPC ......... *F21S 48/115* (2013.01); *F21S 48/125* (2013.01); *F21S 48/1241* (2013.01); *F21S 48/1317* (2013.01); *G03B 21/2033* (2013.01); *G03B 29/00* (2013.01); *F21W 2101/10* (2013.01); *F21W 2102/00* (2018.01); *F21Y 2105/10* (2016.08); *F21Y 2115/10* (2016.08)

(58) Field of Classification Search
CPC .. F21S 48/125; F21S 48/1241; F21S 48/1317; B60Q 1/26; B60Q 1/56; B60Q 1/302; B60Q 1/268; B60Q 1/323
See application file for complete search history.

(56) References Cited

U.S. PATENT DOCUMENTS

| | | | | |
|---|---|---|---|---|
| 2003/0090632 | A1* | 5/2003 | Kim | G02B 27/0905 353/31 |
| 2004/0257790 | A1* | 12/2004 | Tanaka | B60Q 1/26 362/23.07 |
| 2006/0152931 | A1* | 7/2006 | Holman | F21S 8/08 362/297 |
| 2007/0195540 | A1 | 8/2007 | Misawa et al. | |
| 2008/0030990 | A1 | 2/2008 | Hanney | |
| 2008/0055555 | A1* | 3/2008 | Nakamura | H04N 5/7408 353/31 |
| 2008/0198372 | A1 | 8/2008 | Pan | |
| 2013/0027964 | A1* | 1/2013 | Toyota | G02B 6/0008 362/554 |
| 2013/0039087 | A1 | 2/2013 | Gasquet et al. | |
| 2013/0272009 | A1* | 10/2013 | Fujiu | B60Q 1/0058 362/517 |
| 2013/0294101 | A1 | 11/2013 | Brendle | |
| 2014/0321142 | A1 | 10/2014 | Albou | |
| 2015/0167917 | A1 | 6/2015 | Takahashi et al. | |

FOREIGN PATENT DOCUMENTS

| | | |
|---|---|---|
| JP | 2007-227356 A | 9/2007 |
| JP | 2008-512827 A | 4/2008 |
| JP | 2008-201407 A | 9/2008 |
| JP | 2010-182554 A | 8/2010 |
| JP | 2012-064535 A | 3/2012 |
| JP | 2012-119277 A | 6/2012 |
| JP | 2013-026008 A | 2/2013 |
| JP | 2013-225510 A | 10/2013 |
| JP | 2014-096368 A | 5/2014 |
| JP | 2014-117960 A | 6/2014 |
| WO | 2013/037858 A1 | 3/2013 |
| WO | 2013160823 A1 | 10/2013 |

OTHER PUBLICATIONS

Japanese Office Action dated Dec. 5, 2017 for the Japanese Application No. 2016-551376.

* cited by examiner

FIG. 4
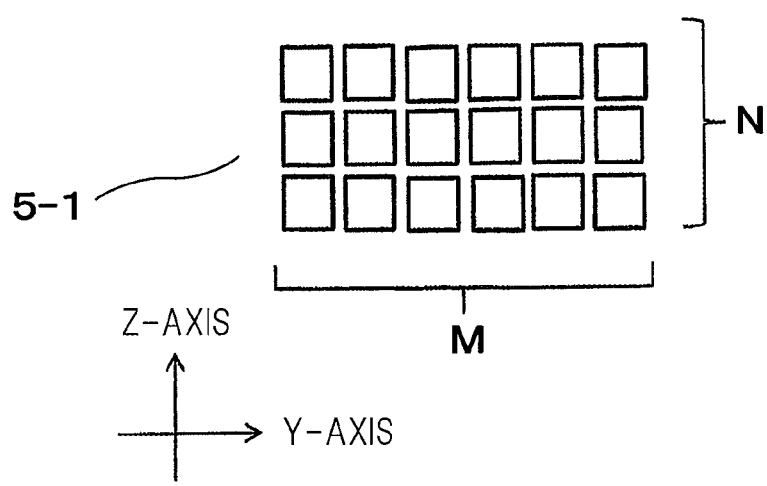
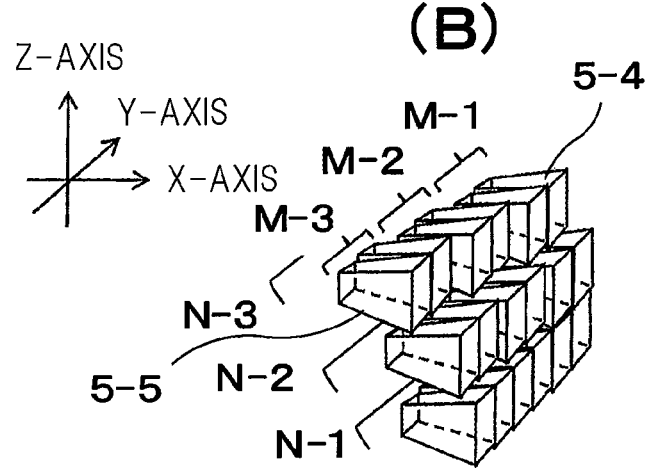

FIG. 14

| NAME | FACE NUMBER | SHAPE | RADIUS OF CURVATURE | INTER-SURFACE DISTANCE | GLASS MATERIAL | ECCENTRICITY · TILT | | |
|---|---|---|---|---|---|---|---|---|
| | | | | | | CONTENTS | ECCENTRICITY | TILT |
| | 0TH FACE | PLANAR | ∞ | 0.303 | | | | |
| COVER GLASS | 1ST FACE | PLANAR | ∞ | 0.65 | 'EAGLEXG' | | | |
| | 2ND FACE | PLANAR | ∞ | 3 | | | | |
| TIR | 3RD FACE | PLANAR | ∞ | 14 | BSO7_HOYA | | | |
| | 4TH FACE | PLANAR | ∞ | 1.400 | | | | |
| L1 | 5TH FACE | SPHERICAL | 18.876 | 5.900 | LAC14_HOYA | ORDINARY ECCENTRICITY | 1.744 | -6.861 |
| | 6TH FACE | SPHERICAL | -331.3 | 2.584 | | | | |
| L2 | 7TH FACE | ASPHERICAL | 25.1016 | 2.5 | 'PMMA30' | | | |
| | 8TH FACE | ASPHERICAL | 24.3055 | 0.641 | | | | |
| L3 | 9TH FACE | SPHERICAL | 27.83 | 4.200 | FC5_HOYA | | | |
| | 10TH FACE | SPHERICAL | -36.3 | 8.242 | | | | |
| APERTURE STOP | 11TH FACE | PLANAR | ∞ | 0.6 | | | | |
| L4 | 12TH FACE | SPHERICAL | -80.7 | 3 | LAC14_HOYA | | | |
| | 13TH FACE | SPHERICAL | -19.465 | 1.903 | | | | |
| L5 | 14TH FACE | SPHERICAL | -15.36 | 1.2 | FC5_HOYA | | | |
| | 15TH FACE | SPHERICAL | 48.432 | 3.675 | | | | |
| L6 | 16TH FACE | SPHERICAL | -56.3700 | 4.1 | FDS90_HOYA | | | |
| | 17TH FACE | SPHERICAL | -25.4790 | 1.388 | | | | |
| L7 | 18TH FACE | ODD-POWERED POLYNOMICAL ASPHERICAL | -56.0039 | 3.7 | 'PMMA25' | | | |
| | 19TH FACE | ODD-POWERED POLYNOMICAL ASPHERICAL | -39.3702 | 8.043 | | | | |
| L8 | 20TH FACE | XY-POLYNOMICAL FACE | ∞ | 6.7 | 'PMMA25' | DECENTER & RETURN | 6.447 | 0 |
| | 21TH FACE | XY-POLYNOMICAL FACE | ∞ | 51.445 | | DECENTER & RETURN | 0.402 | 0 |
| M9 | 22TH FACE | XY-POLYNOMICAL FACE | ∞ | 0 | REFLECTION | DECENTER & RETURN | 18.043 | -34.327 |
| | 23TH FACE | PLANAR | ∞ | -2995.208 | | ORDINARY ECCENTRICITY | 0.000 | -75.927 |
| IMAGE PLANE | 24TH FACE | PLANAR | ∞ | 0 | | DECENTER & RETURN | 0 | 76.488 |

FIG. 15

| CODE | | LBA FACE | LBB FACE | M9 |
|---|---|---|---|---|
| 1/R | c | 0 | 0 | 0 |
| K | K | 0 | 0 | 0 |
| C3 | $Y^1$ | -5.51998E-01 | -6.05444E-01 | 0 |
| C4 | $X^2$ | -4.93381E-02 | -4.29247E-02 | 5.17285E-03 |
| C6 | $Y^2$ | -3.69201E-02 | -2.66694E-03 | -1.09607E-03 |
| C8 | $X^2Y$ | -1.56850E-03 | 1.97515E-04 | -1.57122E-04 |
| C10 | $Y^3$ | -3.32042E-03 | 8.70996E-04 | -3.91753E-06 |
| C11 | $X^4$ | -1.53743E-04 | 7.87521E-06 | 1.37103E-07 |
| C13 | $X^2Y^2$ | -2.61950E-04 | 9.50932E-05 | 4.08290E-06 |
| C15 | $Y^4$ | -5.62944E-05 | -5.30512E-05 | 3.85469E-07 |
| C17 | $X^4Y$ | -2.72906E-05 | -6.42759E-06 | 3.23722E-08 |
| C19 | $X^2Y^3$ | 5.67449E-07 | -2.95608E-06 | -9.28947E-08 |
| C21 | $Y^5$ | -1.66808E-06 | -2.62577E-06 | -1.74558E-08 |
| C22 | $X^6$ | 6.86172E-07 | -3.44246E-07 | 3.34700E-11 |
| C24 | $X^4Y^2$ | 3.35116E-06 | -2.55841E-06 | -2.05221E-09 |
| C26 | $X^2Y^4$ | 2.79548E-06 | -1.50079E-06 | 1.31358E-09 |
| C28 | $Y^6$ | -2.42329E-06 | -1.63035E-08 | 4.46548E-10 |
| C30 | $X^6Y$ | 4.02012E-07 | 1.49893E-07 | -7.81925E-12 |
| C32 | $X^4Y^3$ | 4.71303E-07 | 1.54534E-07 | 6.44321E-11 |
| C34 | $X^2Y^5$ | 3.66726E-07 | 7.11488E-08 | 1.72594E-12 |
| C36 | $Y^7$ | 8.94469E-08 | 4.90683E-09 | -2.32211E-12 |
| C37 | $X^8$ | -1.78761E-08 | -8.37318E-09 | -1.13951E-12 |
| C39 | $X^6Y^2$ | -1.83941E-08 | 1.37441E-08 | 3.07626E-13 |
| C41 | $X^4Y^4$ | 1.15052E-08 | 1.11039E-08 | -1.15097E-12 |
| C43 | $X^2Y^6$ | 5.12537E-08 | 2.18175E-09 | -4.32590E-13 |
| C45 | $Y^8$ | 4.06120E-08 | 2.66553E-10 | -1.44483E-13 |
| C47 | $X^8Y$ | 5.46907E-10 | -2.10429E-09 | 3.82842E-14 |
| C49 | $X^6Y^3$ | -8.70735E-10 | -8.75217E-10 | -5.15782E-15 |
| C51 | $X^4Y^5$ | 1.15997E-09 | -3.73635E-10 | 1.05120E-14 |
| C53 | $X^2Y^7$ | 2.24090E-09 | 1.77299E-10 | 6.69766E-15 |
| C55 | $Y^9$ | 1.83037E-09 | -2.36030E-13 | 3.05816E-15 |
| C56 | $X^{10}$ | 2.56475E-11 | 5.67417E-11 | 2.66779E-16 |
| C58 | $X^8Y^2$ | 5.94883E-10 | 1.52702E-10 | -4.67882E-16 |
| C60 | $X^6Y^4$ | 5.76416E-12 | -2.71303E-11 | 5.64093E-17 |
| C62 | $X^4Y^6$ | 1.03457E-10 | -1.64283E-11 | -3.76423E-17 |
| C64 | $X^2Y^8$ | -5.83727E-11 | -1.45788E-11 | -3.45414E-17 |
| C66 | $Y^{10}$ | 2.90899E-12 | -4.88940E-13 | -1.83517E-17 |

FIG. 16

| | L2A FACE | L2B FACE |
|---|---|---|
| 1/c | 25.1016 | 24.3055 |
| K | 0 | 0 |
| A | -1.73712E-04 | -7.63379E-05 |
| B | -5.71299E-07 | -1.65803E-07 |
| C | 6.68920E-09 | 7.49202E-09 |
| D | 7.36237E-12 | -3.19897E-11 |
| E | -1.62783E-14 | -5.06385E-13 |
| F | -1.54053E-15 | 3.65682E-15 |
| G | -1.56292E-17 | 1.35352E-16 |
| H | 8.31140E-20 | 1.03786E-18 |
| J | 4.06827E-21 | -1.56648E-20 |

FIG. 17

|       | L7A FACE     | L7B FACE     |
|-------|--------------|--------------|
| 1/c   | -56.0039     | -39.3702     |
| K     | 0            | 0            |
| AR3   | -1.06442E-04 | 6.17053E-04  |
| AR4   | -3.28726E-05 | -1.16392E-04 |
| AR6   | 4.16412E-08  | 2.99702E-07  |
| AR8   | -1.19008E-10 | -2.27925E-10 |
| AR10  | 1.41066E-12  | -7.32571E-13 |
| AR12  | -1.62233E-14 | 1.17097E-14  |
| AR14  | -6.75724E-17 | -5.16403E-17 |
| AR16  | -2.46123E-18 | -1.04023E-18 |
| AR18  | -3.98043E-20 | -5.04066E-21 |
| AR20  | 3.43704E-22  | 5.55823E-23  |

VEHICULAR LIGHTING APPARATUS

TECHNICAL FIELD

The present invention relates to a vehicular lighting apparatus which is, for example, attached to a moving body such as an automobile and which emits light onto a road surface when the automobile is running during the night or in such a dark place as tunnel, and particularly relates to a vehicular lighting apparatus which utilizes, as a light source, a solid-state light-emitting element typified by an LED.

BACKGROUND ART

The solid-state light-emitting element typified by an LED has been developed remarkably in recent years. For example, already known in Patent Document 1 has been a vehicular lighting apparatus that is different from a head lamp, but utilizes, to a part of a rear combination lamp attached to a rear side of a vehicle, the LED as its light source.

Then, in Patent Document 2, it has also been already known that a vehicular lighting apparatus has a structure suitable for being used as a head lamp in place of a conventional halogen lamp and utilizes an LED source.

RELATED ART DOCUMENTS

Patent Documents

Patent Document 1: Japanese Patent Application Laid-open No. 2007-227356
Patent Document 2: Japanese Patent Application Laid-open No. 2010-182554

SUMMARY OF THE INVENTION

Problems to be Solved by the Invention

However, the above vehicular lighting apparatuses as conventional techniques have problems. Particularly, it is difficult to use the vehicular lighting apparatus of the former Patent Document 1 as the head lamp attached to a front side of the vehicle. The vehicular lighting apparatus of the latter Patent Document 2 utilizes, as its light source, an LED light source in place of the conventional halogen lamp. This does not necessarily offer a specific advantage over the head lamp provided by the conventional technique.

Namely, in the conventional head lamp attached to the front side of the vehicle, the halogen lamp serving as its light source has a light emission point shape which is small and almost spherical. Therefore, to effectively capture and use all generated beams of emitted light, the substantially overall shape or partial shape of the head lamp is similar to the shape of the halogen lamp. This has been one of important components for a design constituting a front of the vehicle.

Recently, however, has been seen the advent of such vehicles as hybrid cars and electric cars that are equipped with power sources different from internal-combustion engines. These vehicles have ushered in a new field. Together with this, a degree of freedom also in automobile design drafts has been demanded including drafts of the head lamps of the automobiles.

Accordingly, the present invention is achieved in view of the problems posed by the above conventional techniques. It is specifically an object of the invention to provide a vehicular lighting apparatus which uses the solid-state light source as the head lamp in place of the conventional halogen lamp and simultaneously makes the most of its characteristics, and which particularly has a structure superior in a design property.

Means for Solving the Problems

According to the present invention, to achieve the above object, provided is a vehicular lighting apparatus that can be attached to a front end part of a vehicle, and that comprises: a light guide element constructed by molding a translucent resin into a substantially plate-like shape; a planar light-emitting unit that emits illumination light; an optical system that transforms planar light from the light-emitting unit into liner light and that causes the liner light to be incident on one side face of the light guide element; and a lens means formed on the one side face of the light guide element on which the transformed liner light is incident, the lens means condensing or diffusing the liner light, wherein the light condensed and diffused by the lens means is emitted, onto a road surface in front of the vehicle, from the other side face opposite to the one side face of the light guide element.

Effects of the Invention

According to the present invention described above, use of the solid-state light source as the head lamp brings provision of a vehicular lighting apparatus which: is relatively small; can be manufactured at low cost; is superior in mountability to the automobile; and has the structure superior in the design property. Thus, the vehicular lighting apparatus extremely useful in practical applications is provided.

BRIEF DESCRIPTIONS OF THE DRAWINGS

FIG. 4(A) is a first view showing a detailed configuration of a planar light source of the above vehicular lighting apparatus;

FIG. 4(B) is a second view showing a detailed configuration of a planar light source of the above vehicular lighting apparatus;

FIG. 14 is a view showing lens data of lenses composed of a projection optical system in above Embodiment 2;

FIG. 15 is a view showing free-curved surface factors defined by Equation 1 about lenses of the projection optical system in above Embodiment 2;

FIG. 16 is a view showing aspherical surface factors defined by Equation 2 about lenses of the projection optical system in above Embodiment 2;

FIG. 17 is a view showing odd-powered polynomical aspherical surface factors of lenses of the projection optical system in above Embodiment 2;

DETAILED DESCRIPTION OF PREFERRED EMBODIMENTS

Embodiment 1

Hereinafter, a vehicular lighting apparatus that is an embodiment (Embodiment 1) according to the present invention will be detailed in reference to the accompanying drawings.

Figure 1:
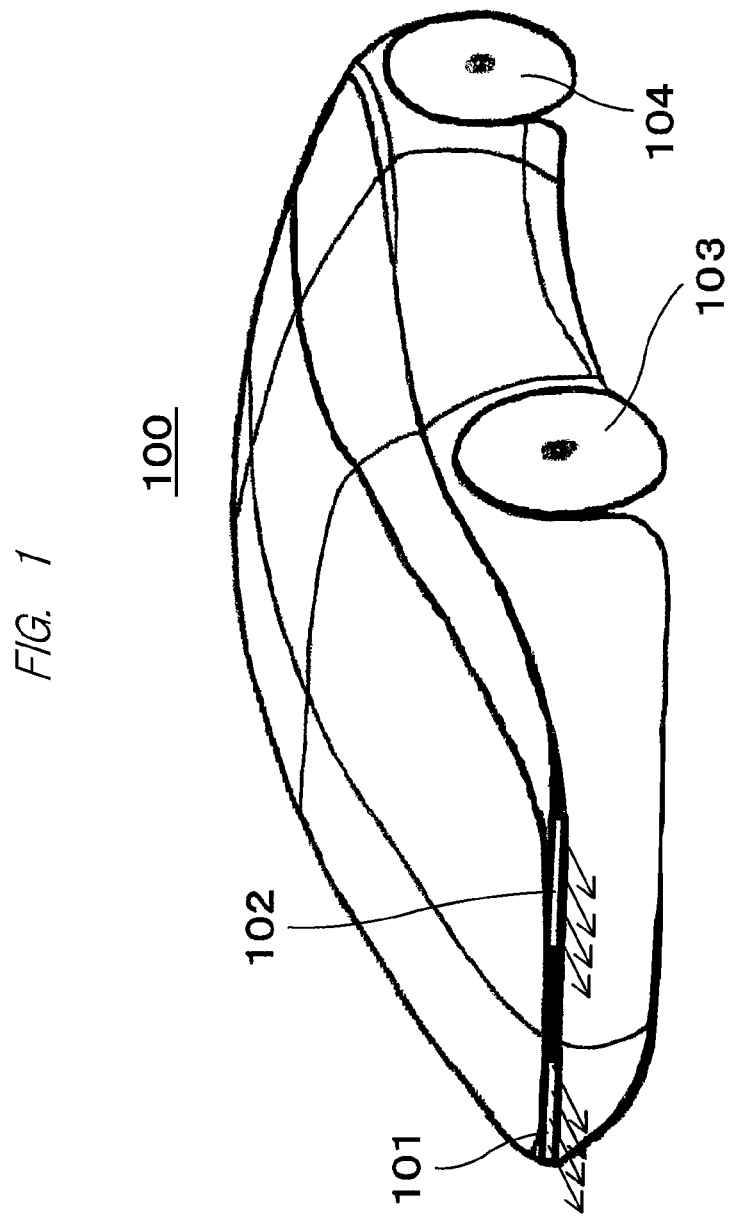
FIG. 1 is an exterior view of an automobile equipped, as a head lamp, with a vehicular lighting apparatus that is an embodiment (Embodiment 1) according to the present invention.

Firstly, FIG. 1 shows an exterior view of an automobile equipped with a vehicular lighting apparatus of the present invention as its head lamp. In FIG. 1, namely, to reduce air resistance during traveling of the automobile, an automobile body 100 is molded into a so-called streamline shape. A right composite light 101 and a left composite light 102 are attached to both sides of a front of the automobile body 100, respectively. In FIG. 1, reference numeral 103 denotes a front wheel of the automobile and reference numeral 104 denotes a rear wheel of the automobile.

FIG. 1 clearly shows that the left and right composite lights 101 and 102, i.e., the vehicular lighting apparatus of the present invention, are each attached linearly to a front end part of the automobile body 100. The vehicular lighting apparatus having such an exterior shape, in comparison with a conventional vehicular lighting apparatus having a halogen lamp etc., can be attached freely to the front end part of the vehicle without disturbing the streamline shape of the automobile body. This widely improves a degree of freedom in automobile draft including its head lamp.

Secondly, hereinafter will be explained the above-mentioned head lamp that is the vehicular lighting apparatus of the present invention, i.e., specifically, a detailed structure of the composite light 101 shown on a left side in the exterior view of the automobile of FIG. 1.

Figure 2:
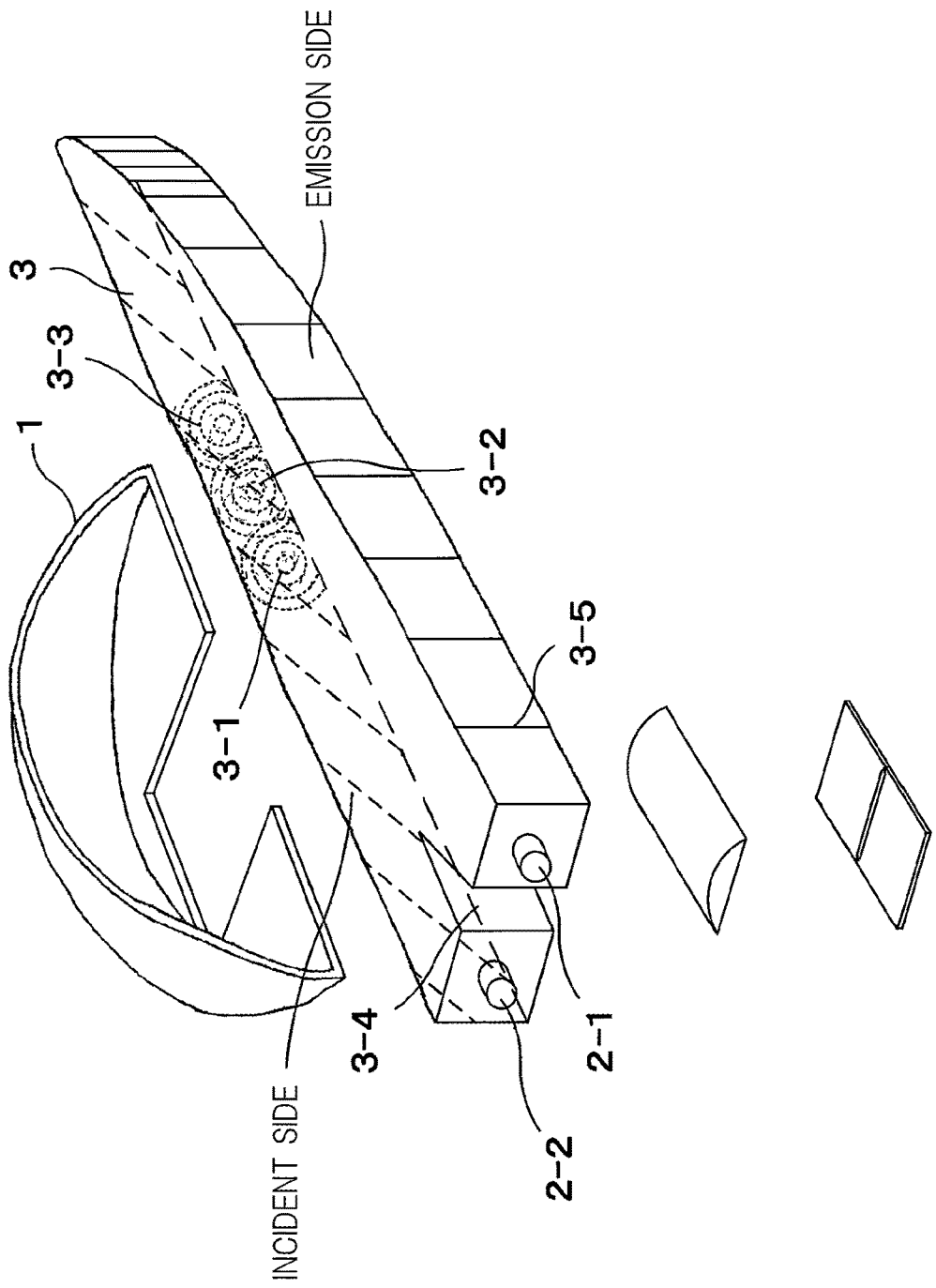
FIG. 2 is a development perspective view of an overall configuration of a composite light that is the above vehicular lighting apparatus.
Figure 3:
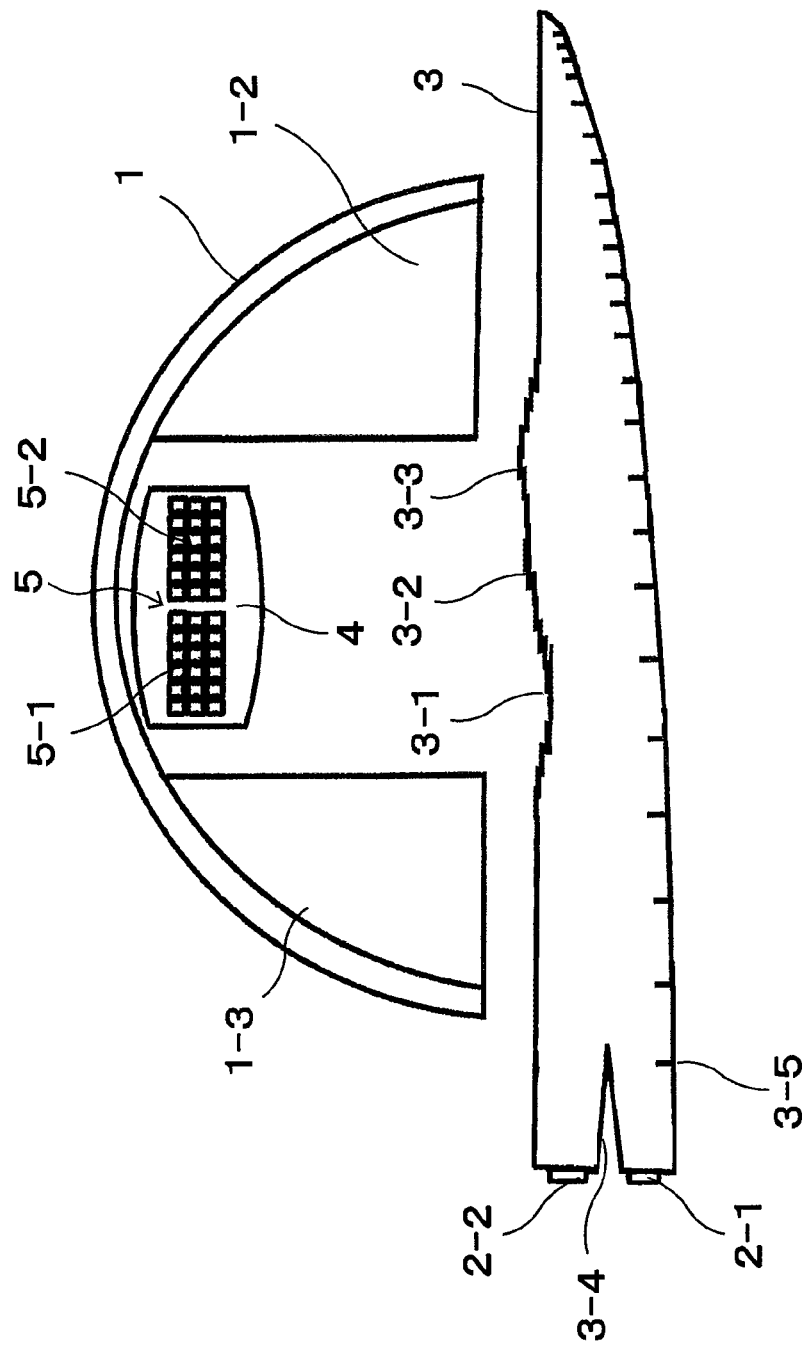
FIG. 3 is a top view showing an overall configuration of the above vehicular lighting apparatus.

FIG. 2 is a development perspective view of an overall configuration of the above composite light 101, and FIG. 3 is a top view of the composite light 101. FIGS. 2 and 3 clearly show that the composite light 101 has a composite lens element 3 which is, for example, a flat bar-like or plate-like light guide element molded by die-molding a translucent resin such as acryl. An outline of the light guide element is formed into a long and narrow shape with one side face tapered (substantially an isosceles triangle).

In this example, a plurality of (two in this example) light sources 2-1 and 2-2, which are composed of respective individual LEDs and emit beams of light different in color, are attached to one end face (left end face in this example) in the longitudinal direction of the composite lens element 3 that is the above flat light guide element. The above end of the composite lens element 3 has a "V-shaped" groove formed for separating beams of light. As a result, two inner surfaces of the light guide element that are counter to the "V-shaped" groove each function as a light reflection surface (surface 3-4 in FIG. 2). In this example, a white LED that emits white light is used as one solid-state light source 2-1, and a yellow LED that emits yellow light is used as the other solid-state light source 2-2.

As clearly shown also by FIG. 3, the composite lens element 3 as the flat light guide element has side faces (a front side face and a rear side face in FIG. 3) extending along its longitudinal direction. Light from the above light sources 2-1 and 2-2 as well as light from a different light source described later are emitted from the front side face toward the front of the vehicle. On its rear side face, a reflection mirror 1 described below is disposed. Reference numeral 1-2 in FIG. 3 denotes ends (reflection mirror ends) formed on both sides for locating the reflection mirror 1.

On the front side face of the composite lens element 3 are formed a plurality of so-called light diffusion portions 3-5 which are, for example, vertically extending grooves each having a substantially "V-shaped" section. These light diffusion portions 3-5 as the grooves are formed irregularly on the front side face of the composite lens element 3. The portions are arranged relatively sparsely (with larger inter-groove distance) in the vicinity of ends to which the light sources 2-1 and 2-2 are attached, and are arranged relatively densely (with smaller inter-groove distance) in the vicinity of the other end opposite to the above ends. The light diffusion portions 3-5 are not always limited to be the above vertical grooves, but may uniformly diffuse light as a whole, and may be, for example, dot-like grooves, dot-like projections, and vertical projections as other shapes.

Under the reflection mirror 1, a planer light source (light-emitting unit) 5 that emits white light with a high intensity is disposed in place of the conventional halogen lamp etc., and a lens 4 is provided between the planer light source 5 and the reflection mirror 1. In this example, although describe later as one example, the planer light source 5 with a high light emission intensity is constructed by arranging a plurality of (two in this example) composite light sources 5-1 and 5-2 each having a plurality of LEDs. For example, a lenticular lens with a substantially columnar outline is used as the lens 4 in order to condense planar light into linear light and to change the shape of a beam of light. The lens 4 is disposed above the planar light source 5 in such a way as to almost cover the whole of its light emission surface. The lens 4 for condensing the beam of light from the composite light source (planar light source) 5 or changing the shape of the beam may have a toroidal, aspherical, or free-curved surface shape besides the lenticular lens.

The reflection mirror 1, as seen apparently also from the above Figure, has a curved reflection surface with, for example, a spherical or aspherical, parabolic, or free-curved surface shape. The reflection mirror 1: reflects and condenses, on its reflection surface, light which has been emitted from the planar light source 5 and transformed into substantially linear light through the lens 4; and guides the reflected light to an incident surface that is a rear side face of the composite lens element 3.

Provided on the rear side face extending in the longitudinal direction of the composite lens element 3 and used as the incident surface of the composite lens element 3 is an optical means which transforms the light reflected from the reflection mirror 1 into a given shape to create a desired illumination area (light distribution) on a road surface in front of the vehicle. For example, such an optical means may be formed as a lens surface of a Fresnel lens etc. or as a diffraction grating (brazed diffraction grating). Forming the Fresnel lens or diffraction grating allows avoiding an increase in thickness or outline of the composite lens element 3, and is therefore particularly preferable. In this example, a plurality of (three in this example) diffraction gratings 3-1, 3-2, and 3-3 are formed as indicated by broken lines in FIG. 2. The diffraction gratings 3-1, 3-2, and 3-3 are formed such that the diffraction grating 3-2 at a center overlaps the diffraction gratings 3-1 and 3-3 on its both sides.

FIG. 4(A) depicts a detail of the composite light source 5-1 out of the plurality of (two in this example) composite light sources 5-1 and 5-2 making up the above planar light source 5. In this Figure, the composite light source 5-1 is composed of a plurality of (M×N=6×3 in FIG. 4(A)) high output power LED elements (semiconductor light-emitting elements) arranged in a matrix formation on a plane (Y-Z axes). These plural LED elements can be driven separately by control lines (not depicted) etc. A size of each LED element is, for example, 0.2 mm×0.2 mm, and a distance between the respective LED elements is 0.04 mm.

FIG. 4(B) depicts so-called light guides 5-4, which are arranged close to the light emission surfaces of the M×N LED elements. Each light guide 5-4 has one opening (left-hand side in Figure) serving as a unit light source 5-5 and the other opening (right-hand side in Figure) left opened to illuminate light from the unit light source 5-5 as a beam of light with desired light distribution characteristics. These light guides 5-4 may be, for example, formed into quadrangular pyramids, as shown in Figure, or into cones. The light guides 5-4 each have a function of reflecting light from the LED light-emitting elements arranged counter to each other and transforming the reflected light into a beam of light of a given shape, especially into a beam of light with a smaller diffusion angle; and allow a light emission point to be set in a height direction (X-axis direction in Figure). By arranging the light guides 5-4 three-dimensionally (along the X-axis, Y-axis, and Z-axis) with various heights, it is therefore possible to properly adjust the position of the light emission point of light from the planar light source 5. The planar light source having the above structure is thus particularly advantageous for a case of determining the light distribution of illumination provided by the light that is condensed or diffused through the diffraction gratings 3-1, 3-2, and 3-3 formed on the rear side face of the composite lens element 3 and that is emitted out of the front side face of the composite lens element 3.

The above example is described as the composite light source composed of M×N=6×3 high output power LED elements (semiconductor light-emitting elements). Each light-emitting element, however, may be composed of an array of more minute light-emitting elements. In short, the light-emitting element may be a planar light source that offers the desired light emission intensity.

Functions and operations of the vehicular lighting apparatus according to the present invention having the above configuration, in particular, those of a head lamp will hereinafter be described.

<Running Lamp Function>

This is a so-called daytime running lamp (DRL) function of causing a part of the head light of the automobile to emit a linear beam of light during traveling of the vehicle.

Figure 5:
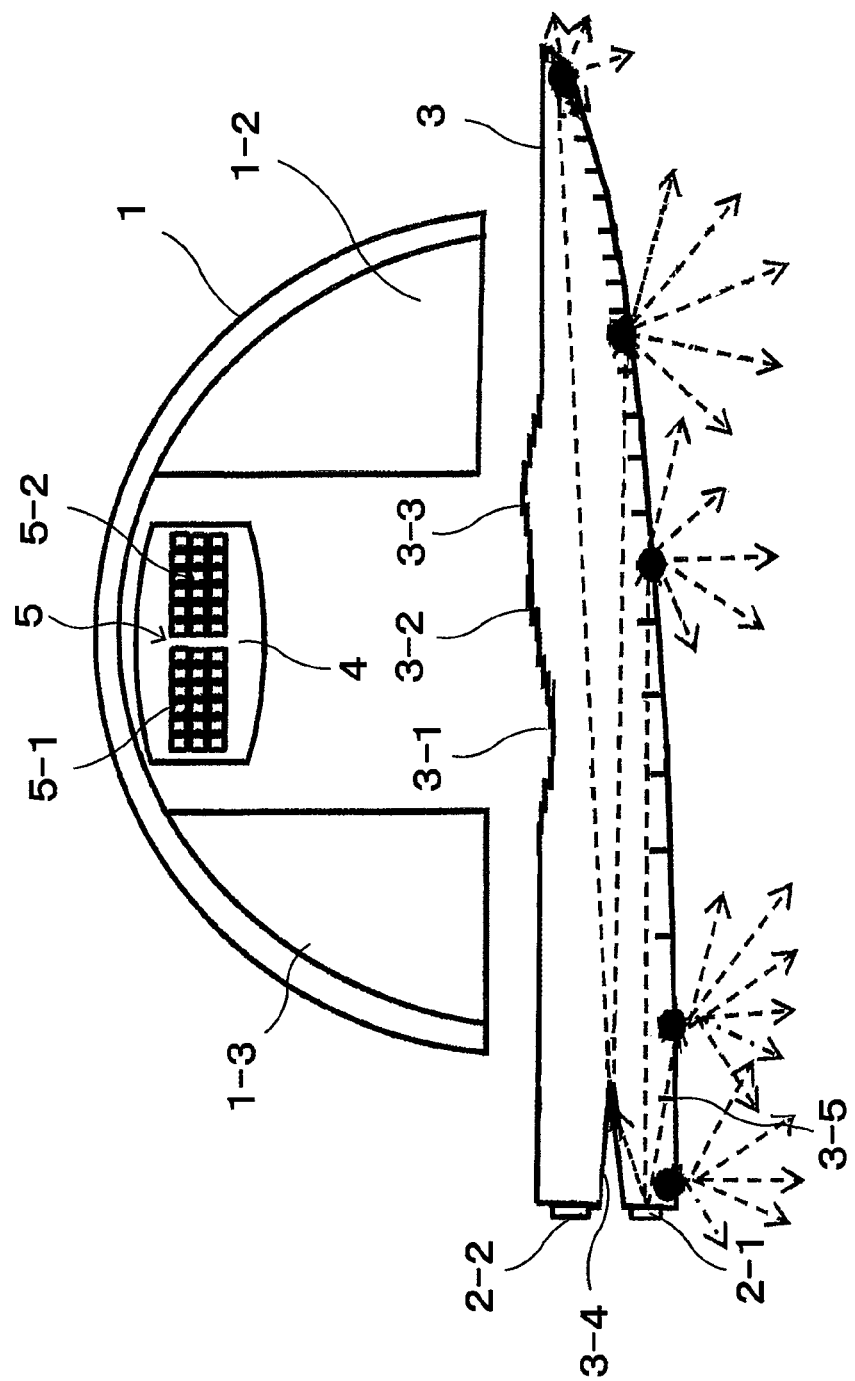
FIG. 5 is a view for explaining a light emission operation when the above vehicular lighting apparatus functions as a running lamp.

When the running lamp function is exerted, the one light source 2-1 attached to an end face (left end face in Figure) of the composite lens element 3 making up the head lamp is caused to emit light, as shown in FIG. 5. (White) light emitted out of the light source 2-1: propagates through an interior of the flat, bar-like light guide element formed substantially into an isosceles triangle, the light guide element making up the composite lens element 3; and outwardly comes out of the composite lens element 3 in almost the whole area in the longitudinal direction of the front side face of the composite lens element 3 serving as a light emission surface, via the light diffusion portions 3-5 etc. as indicated by dotted line arrows in Figure. As a result, the DRL function of causing the part of the head light of the automobile to emit the linear beam of light during traveling of the vehicle is performed as indicated by the reference numerals 101 and 102 in FIG. 1.

<Direction Indicator Lamp Function>

This is a so-called turn signal lamp function of causing a part of the head light to emit light for indicating the traveling direction of the automobile.

Figure 6:
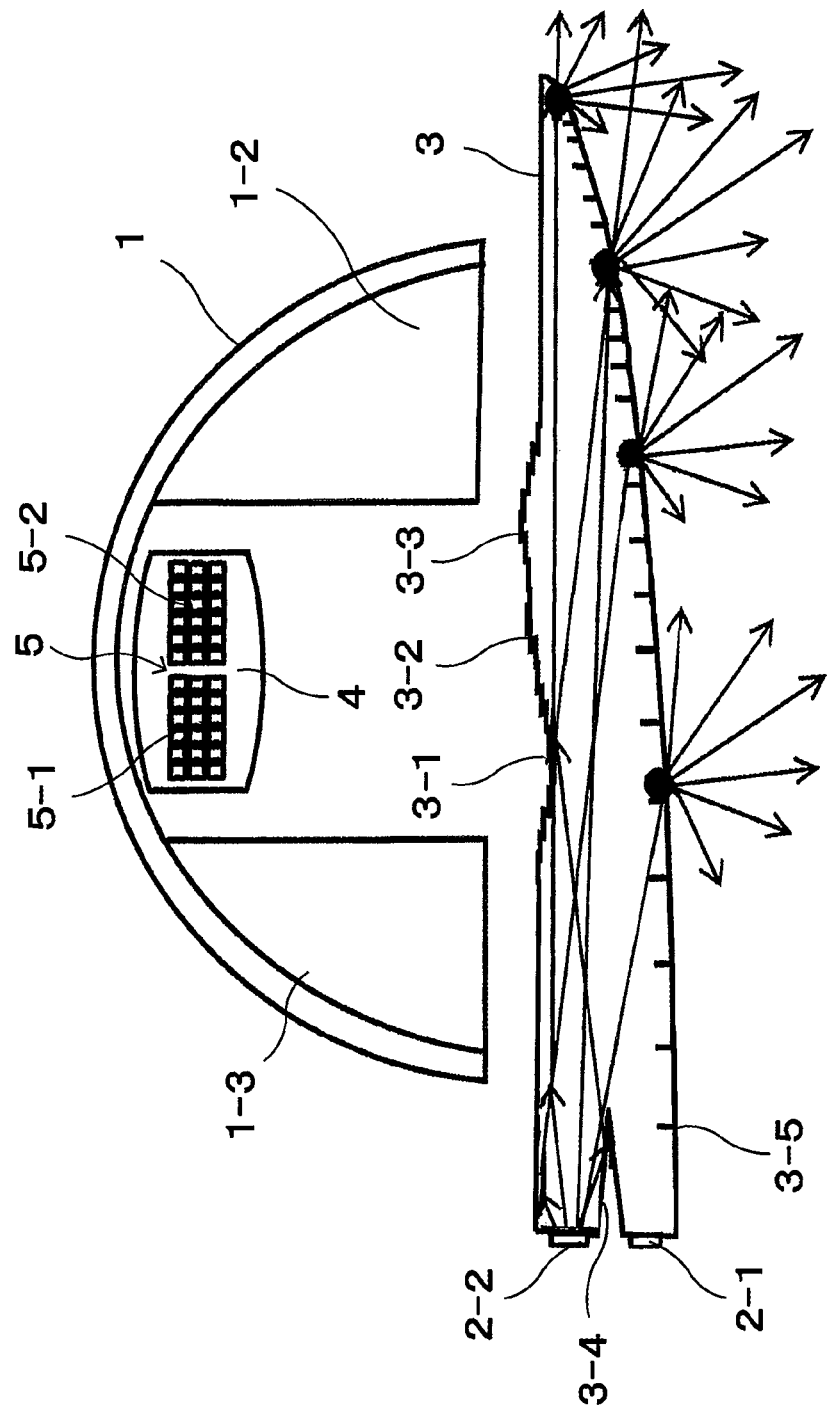
FIG. 6 is a view for explaining a light emission operation when the above vehicular lighting apparatus functions as a direction indication lamp.
Figure 7:
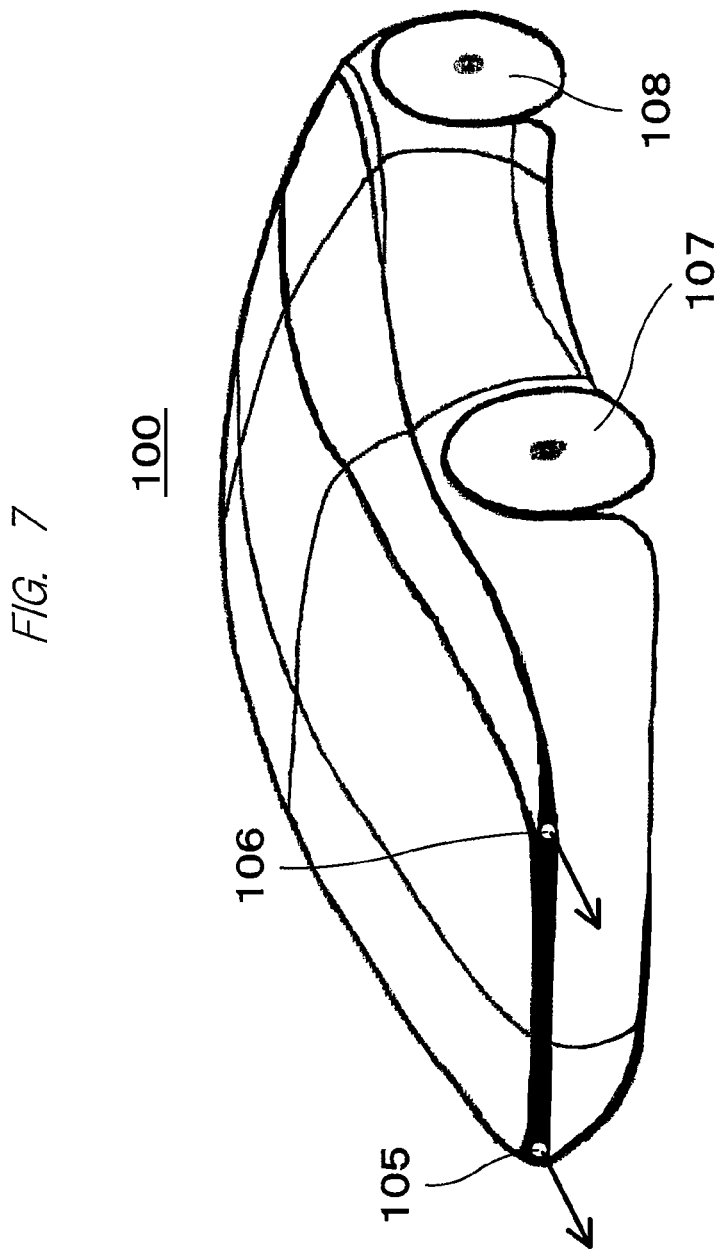
FIG. 7 is a view showing an automobile appearance while the above vehicular lighting apparatus lights up as the direction indication lamp.

When the direction indicator lamp function is exerted, the other light source 2-2 attached to the end face (left end face in Figure) of the composite lens element 3 making up the above head lamp is caused to emit light, as shown in FIG. 6. (Yellow) light emitted out of the light source 2-2: propagates through the interior of the flat, bar-like light guide element formed substantially into an isosceles triangle, the light Guide element making up the composite lens element 3; and outwardly comes out of the composite lens element 3 via the light diffusion portions 3-5 formed densely near the other end face (right end face in Figure) of the composite lens element 3, as indicated by solid line arrows in Figure. As a result, the direction indicator lamp function of causing the head light of the automobile to light up at both ends of the head light for indicating the traveling direction of the vehicle is performed, as indicated by reference numerals 105 and 106 in FIG. 7.

The beam of (white) light emitted from the light source 2-1 for the above running lamp function and the beam of (yellow) light emitted from the light source 2-2 for the direction indicator lamp function are separated from each other by the two internal surfaces of the light guide element that are counter to the "V-shaped" groove formed on the end of the composite lens element 3. Internal surfaces work as light reflection surfaces (surfaces 3-4 in Figure), respectively. This prevents both beams of light from mixing with each other inside the light guide element of the composite lens element 3.

<Head Lamp Function>

A major function of the head lamp is a function of emitting illumination light onto the road surface on which the automobile travels.

Figure 8:
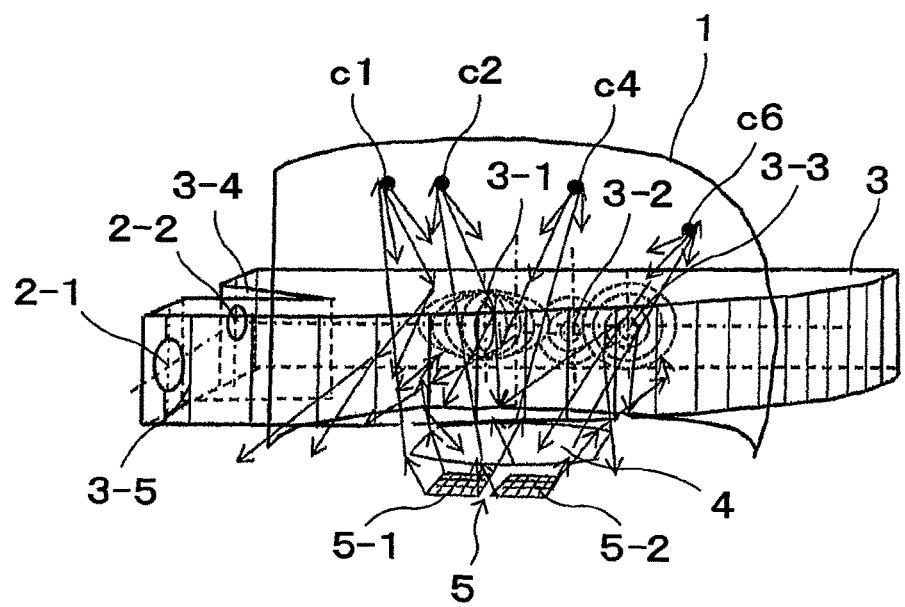
FIG. 8 is a perspective view for explaining a light emission operation when the above vehicular lighting apparatus functions as a head lamp.
Figure 9:
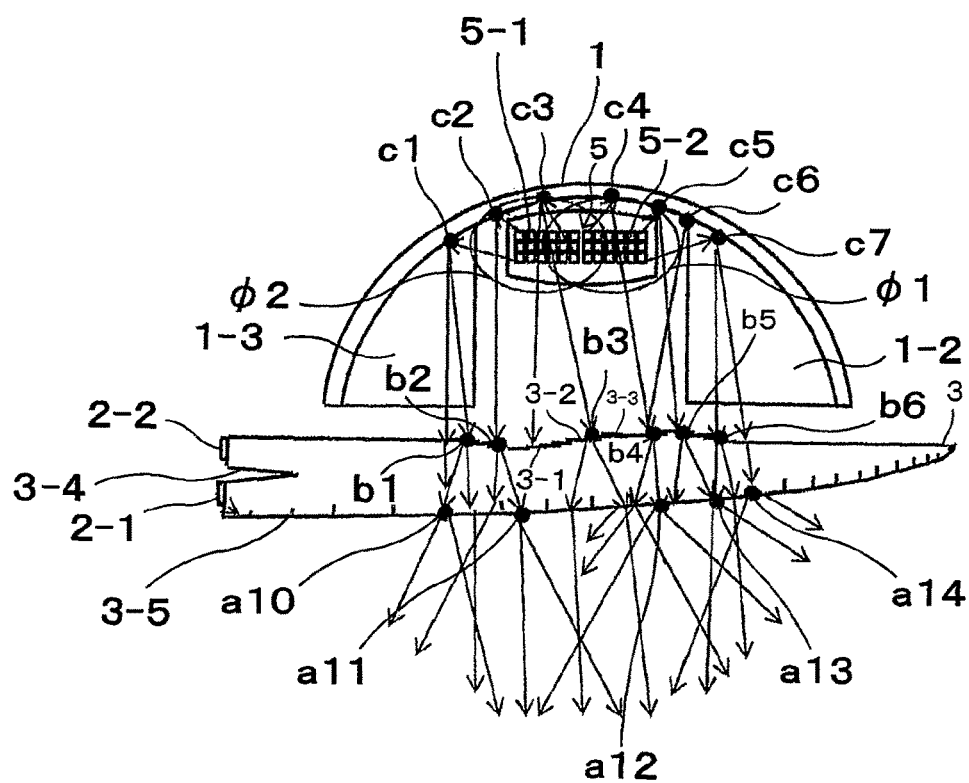
FIG. 9 is a top view for explaining a light emission operation when the above vehicular lighting apparatus functions as the head lamp.

In this case, as indicated by arrows in FIGS. 8 and 9, beams of light with a high intensity from the planar light source 5 (i.e., two composite light sources 5-1 and 5-2) are guided into the light guide element used as the composite lens element 3 via the lens 4 and the reflection mirror 1 (see reflection points c1 to c6 in FIG. 8). A surface of the reflection mirror may be formed into a mirror surface or into a surface defining fine optical patterns for detailed control of light distribution characteristics to obtain desired light distribution characteristics. The beams of light: are thus condensed by optical means (see diffraction gratings 3-1, 3-2, and 3-3 in this example and reference numerals b1 to b6 in FIG. 9) formed on the rear side face used as an incident surface of the light guide element; then come out of an emission surface used as the front side face of the light guide element; and are diffused by the optical diffusion portions 3-5 formed on the emission surface and are emitted in front of the vehicle. In this manner, according to the vehicular lighting apparatus of the present invention, the light distribution characteristics of the beams of light emitted out of the planar light source 5 are controlled through the lens 4, the reflection mirror 1, and the optical means formed on the composite lens element 3. In this case, the beams of light are illuminated as light with superior light distribution characteristics, by forming the surface of the reflection mirror 1 not into a mirror surface but into a surface defining a fine optical pattern for controlling the light distribution characteristics.

Then, a light emission area and a light emission intensity of the planar light source 5 are controlled to obtain the desired light distribution characteristics, as described below.

A case in which illuminated light from the composite lens element 3 is switched between so-called high beam emission and low beam emission will first be described. In this case, for example, the plurality of light-emitting elements making up the planar light source 5 are driven selectively. More specifically, for example, the light-emitting elements located near a line-directional planar light source 5 among the light-emitting elements making up the planar light source 5 (two composite light sources 5-1 and 5-2 each having the configuration shown in FIG. 4(A)) are caused to emit light of: the light-emitting elements located correspondingly on an upper line in order to produce the high beam; and the light-emitting elements located correspondingly on a lower line in order to produce a low beam. To produce a wide low beam, the light-emitting elements driven by the planar light source 5 may be increased in its line direction.

For example, if the two composite light sources 5-1 and 5-2 making up the planar light source 5 are switched selectively (when the light source 5 is a single sheet of planar element, its left and right areas are switched), the light illuminated in front of the vehicle from the front side face of the composite lens element 3 used as the light guide element can be moved left and right. In other words, a light emission area (pattern) of the planar light source 5 is changed to obtain a desired light distribution pattern.

Figure 10:
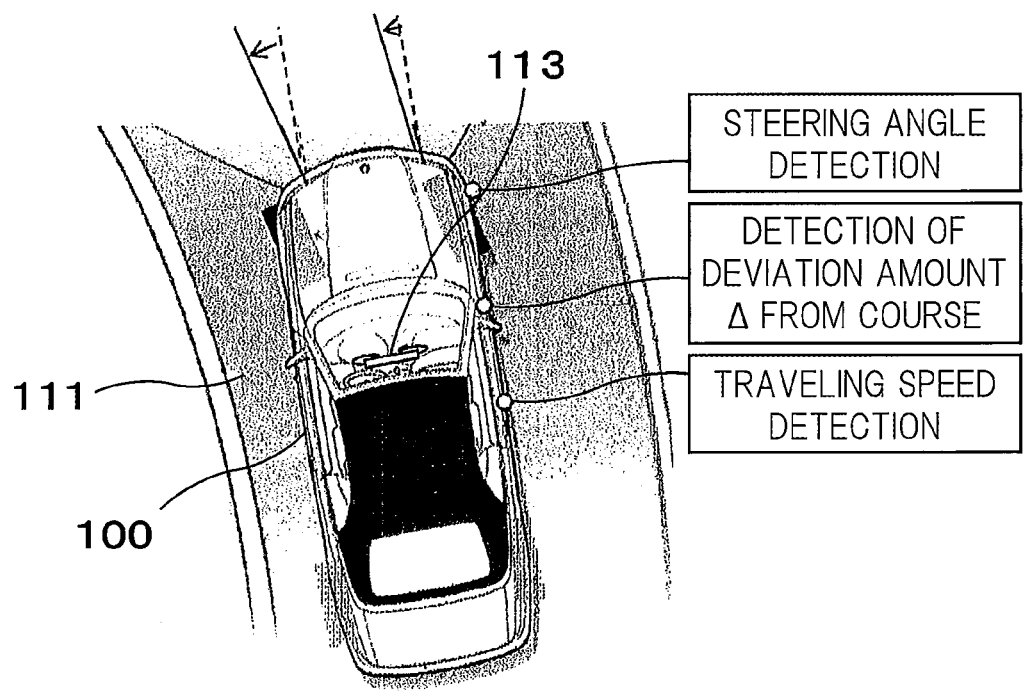
FIG. 10 is a view for explaining a light distribution characteristic of illumination light according to the above vehicular lighting apparatus.
Figure 11:
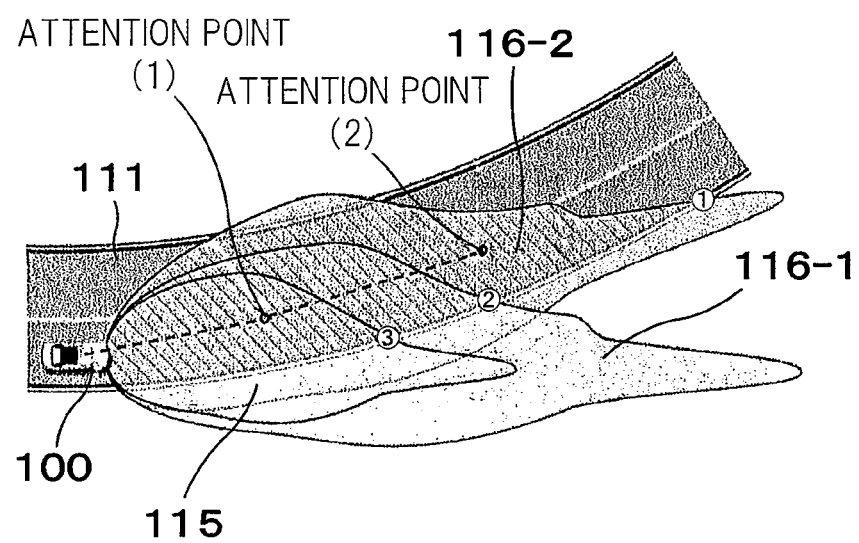
FIG. 11 is a view for explaining a light distribution characteristic of illumination light according to the above vehicular lighting apparatus.

This achieves a function of selecting one of the above high beam, low beam, and wide low beam, as well as a function of automatically directing a beam of light from the head light in the direction of travel of the vehicle, based on signals detected by a steering angle detecting means, a detecting means for a deviation amount Δ from a course, and a traveling speed detecting means which are mounted to the automobile body 100 (not detailed herein), as shown in FIGS. 10 and 11. Through achievement of these functions, a so-called adaptive head light can be realized. In FIG. 10, reference numeral 111 denotes a road on which the automobile body 100 travels, and reference numeral 113 denotes a means for detecting a front view, such as a CCD camera, which is attached to the automobile.

FIG. 11 depicts an illumination characteristic obtained from the vehicular lighting apparatus (head light) according to the present invention. This shows a state of change from an ordinary low beam 115 or high beam 116-1 into a high beam 116-2 moving along a steering direction of the vehicle when the straight running vehicle approaches a corner. Namely, an attention point (1) and an attention point (2) lying in front of the vehicle as shown in Figure, and also the attention point (2) that cannot be detected only by the ordinary low beam 115 or high beam 116-1 can be detected by the high beam 116-2 that moves along the steering direction. This allows assisting in performing safer driving.

In addition, a light distribution pattern that enables the safer driving can be obtained also by changing the light emission area (pattern) of the planar light source 5, based on a detection signal transmitted from the means for detecting a front view such as the CCD camera. For example, when the vehicle detects an oncoming car in its front view, the vehicle turns off the light-emitting elements in an area of the beams of light emitted toward the oncoming car or reduces the light emission intensity of the light-emitting elements; or shifts the light distribution direction of light from the head lamp. Therefore, it is also possible to avoid dazzling occurrence to the oncoming car by the light emitted out of the head lamp.

One embodiment of the present invention has been described above in detail. The embodiment can achieve the superior vehicular lighting apparatus which, as clearly indicated by its exterior shape, is relatively small; can be attached freely to the front end part of the vehicle; allows a significant improvement in a degree of freedom in drafting the vehicle including its head lamp; and, by an integral configuration including the running lamp and direction indicator lamp, can reduce manufacturing costs and simplify assembling work of assembling the lighting apparatus into the vehicle body.

The embodiment of applying the vehicular lighting apparatus of the present invention, particularly, to the head lamp has been described above in detail. The present invention is, however, not limited to this embodiment and, for example, may be used as a tail lamp attached to the rear of the vehicle body. When the vehicular lighting apparatus is used as a brake lamp, in particular, the planar light source with a high light emission intensity and the reflection mirror are unnecessary. Therefore, the vehicular lighting apparatus can be achieved with a simple structure and at a low price. In this case, red LEDs that emit red light may be preferably used as the semiconductor light-emitting elements.

Embodiment 2

Secondly, another embodiment (Embodiment 2) will be explained below by referring to the accompanying FIGS. 12 to 21. A vehicular lighting apparatus as this embodiment is an apparatus for projecting images onto a road surface.

Figure 12:
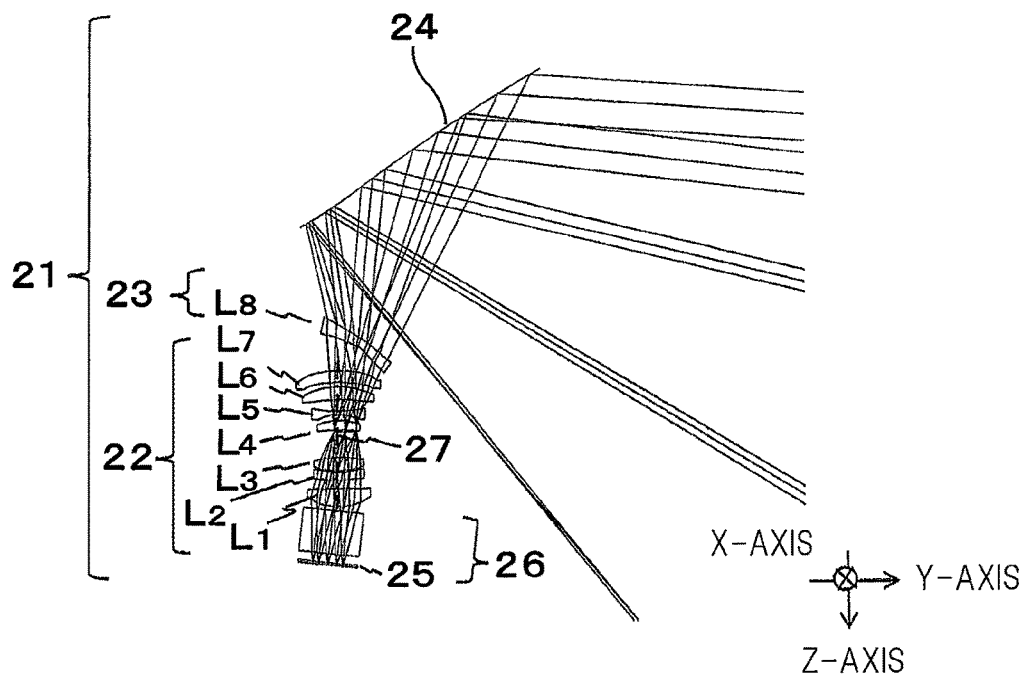
FIG. 12 is a configuration diagram showing one example of a projection optical system making up a vehicular lighting apparatus that is another embodiment (Embodiment 2) according to the present invention.
Figure 13:
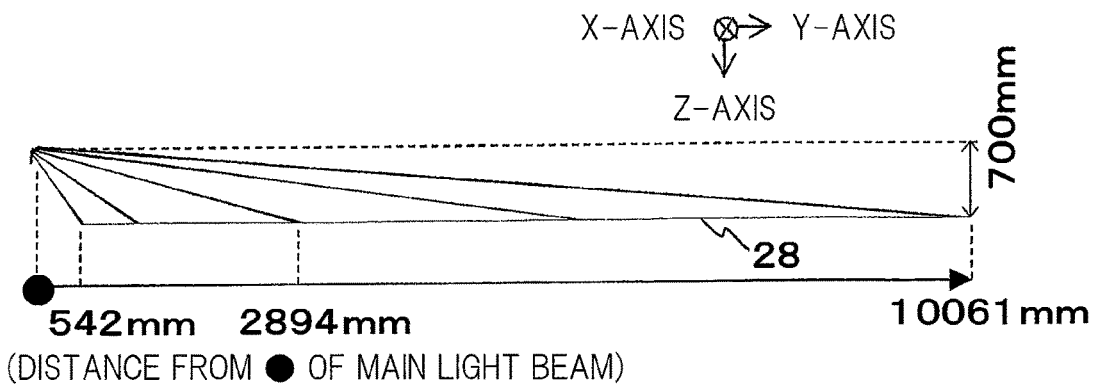
FIG. 13 is a beam chart of Embodiment 2 including an image plane of the vehicular lighting apparatus that is the above embodiment (Embodiment 2)

FIG. 12 is a configuration diagram of a projection optical system making up a vehicular lighting apparatus according to Embodiment 2, and FIG. 13 is a beam chart including an image plane according to the Embodiment 2. Image light emitted from an image display element 25 travels through a filter 26 composed of a cover glass and a total reflection prism, is refracted by a coaxial lens system 22 and a free-curved surface lens 23, and is reflected by a free-curved mirror 24 to impinge on a image plane 28 (road). The projection optical system may be incorporated integrally in the vehicular lighting apparatus of the above embodiment or disposed outside the vehicular lighting apparatus.

The coaxial lens system 22 is a retro-focus type lens system composed of a group of lenses (lens $L_1$ to lens $L_3$) having positive refraction power and a group of lenses (lens $L_4$ to lens $L_7$) having negative refraction power.

These respective groups of lenses are arranged in order from a side of the image display element 25, and comprises: a glass lens $L_1$ having positive refraction power and a surface with a small radius of curvature facing the image display element 25; a plastic aspherical lens $L_2$ of a meniscus having a convex surface facing the image display element 25; a glass lens $L_3$ having positive refraction power and both convex surfaces; a glass lens $L_4$ of a meniscus having positive refraction power and a concave surface facing the image display element 25; a glass lens $L_5$ having negative refraction power and both concave surfaces; a glass lens $L_6$ of a meniscus having positive refraction power and a concave surface facing the image display element 25; and a plastic, odd-powered polynomial aspherical lens $L_7$ of a meniscus having a concave surface facing the image display element 25. The lenses $L_1$ to $L_7$ have a common optical axis 27.

The free-curved surface lens 23 is a plastic free-curved surface lens $L_8$ of a meniscus having a concave surface facing the image display element 25.

A distance in a vertical direction (Z-axis in Figure) between a center of the optical axis of the free-curved mirror 24, which is an optical element on an emission side, and the image plane 28, namely, a projection distance is 700 mm, and a size of an image in a direction of its long sides is 9519 mm (=10061−542), thereby realizing a large display size. A detail of the projection size will be described later in a description of an aberration of lens distortion.

FIG. 14 shows a table of lens data of Embodiment 2, in which radius of curvature is expressed as a positive sign when a center of the radius of curvature lies in a direction of travel of light. An inter-surface distance represents a distance along the optical axis between the apex of one surface and the apex of the next surface.

Eccentricity is expressed as a value on the Y-axis, and tilt represents a rotation around the X-axis in the Y-Z plane. The eccentricity and tilt affect the applicable surface in an order of the eccentricity and tilt. In the case of "ordinary eccentricity", the next surface is located at a position of an inter-surface distance on new coordinates affected by the eccentricity and tilt. "DAR" is an abbreviation of decenter and return, in which case the eccentricity and tilt affect only the surface and do not affect the next surface. PMMA, which is a name of a glass material, represents a plastic acrylic glass.

FIG. 15 shows a table of free-curved surface factors defined by Equation 1 below. The free-curved surface factor represents a shape which is rotation-asymmetric to each optical axis 9 (Z-axis) and which is defined by components of cone terms and XY polynomial terms. For example, cases where X is a square term (m=2) and Y is a third power term (n=3) correspond to a factor of $C_{19}$ given by J={$(2+3)^2$+2+3×3}/2+1=19, A position of the optical axis of each free-curved surface is determined by an amount of eccentricity and tilt listed in the table of lens data in FIG. 14.

$$Z = \frac{c \cdot (x^2 + y^2)}{1 + \sqrt{1 - (1+K)c^2 \cdot (x^2 + y^2)}} + \sum \sum (C_j(m,n) \times x^m \times y^n) \quad \text{[Eq. 1]}$$

$$j = [(m+n)^2 + m + 3n]/2 + 1$$

FIG. 16 shows a table of aspherical surface factors defined by Equation 2 below. The aspherical surface factor represents a shape which is rotation-symmetric to each optical axis (Z-axis) and which is defined by components of cone terms and even-ordered power terms, the even-ordered power terms ranging from a 4th power term to a 20th power term based on a height h from the optical axis.

$$Z = \frac{c \cdot h^2}{1 + \sqrt{1 - (1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20} \quad \text{[Eq. 2]}$$

Odd-powered polynomial aspherical surface factors listed in a table of FIG. 17 each represent a shape defined by adding components of odd-powered terms to the aspherical surface factors listed in the table of FIG. 16. Since the height h denotes a positive value, a shape is rotation-symmetrical.

Figure 18:
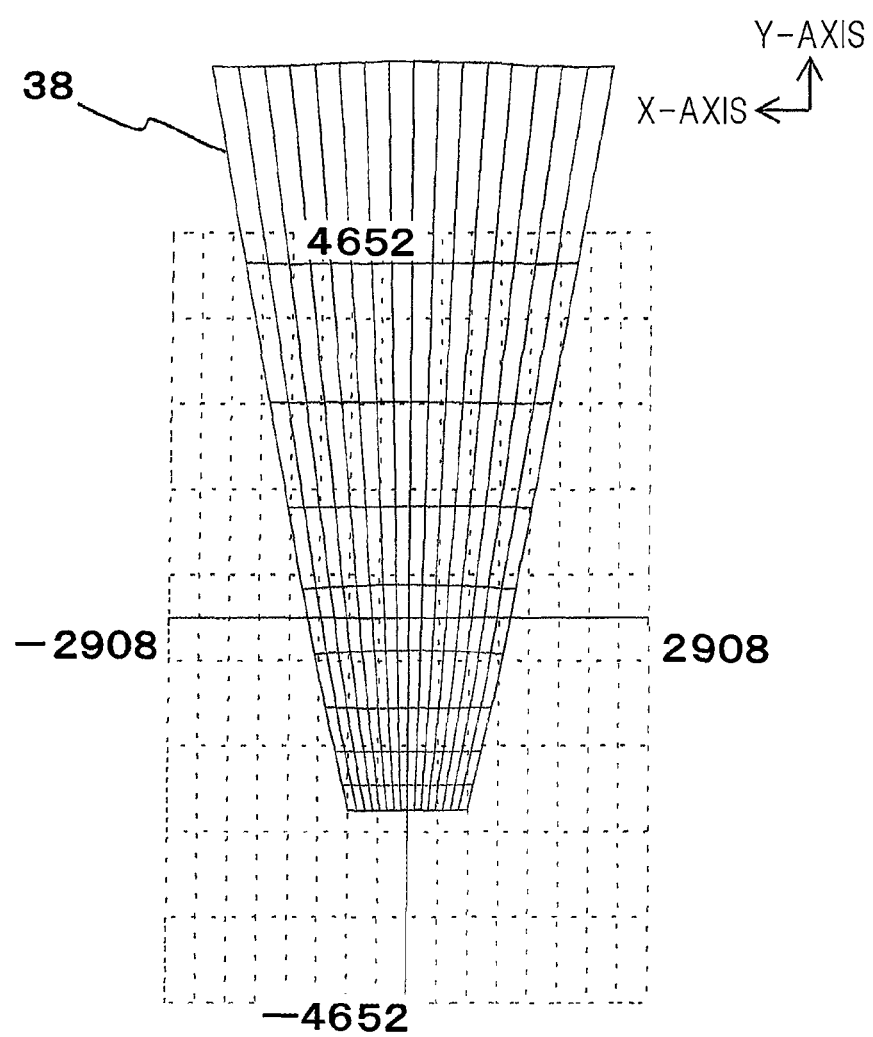
FIG. 18 is a view showing distribution performance of the projection optical system in above Embodiment 2.
Figure 19:
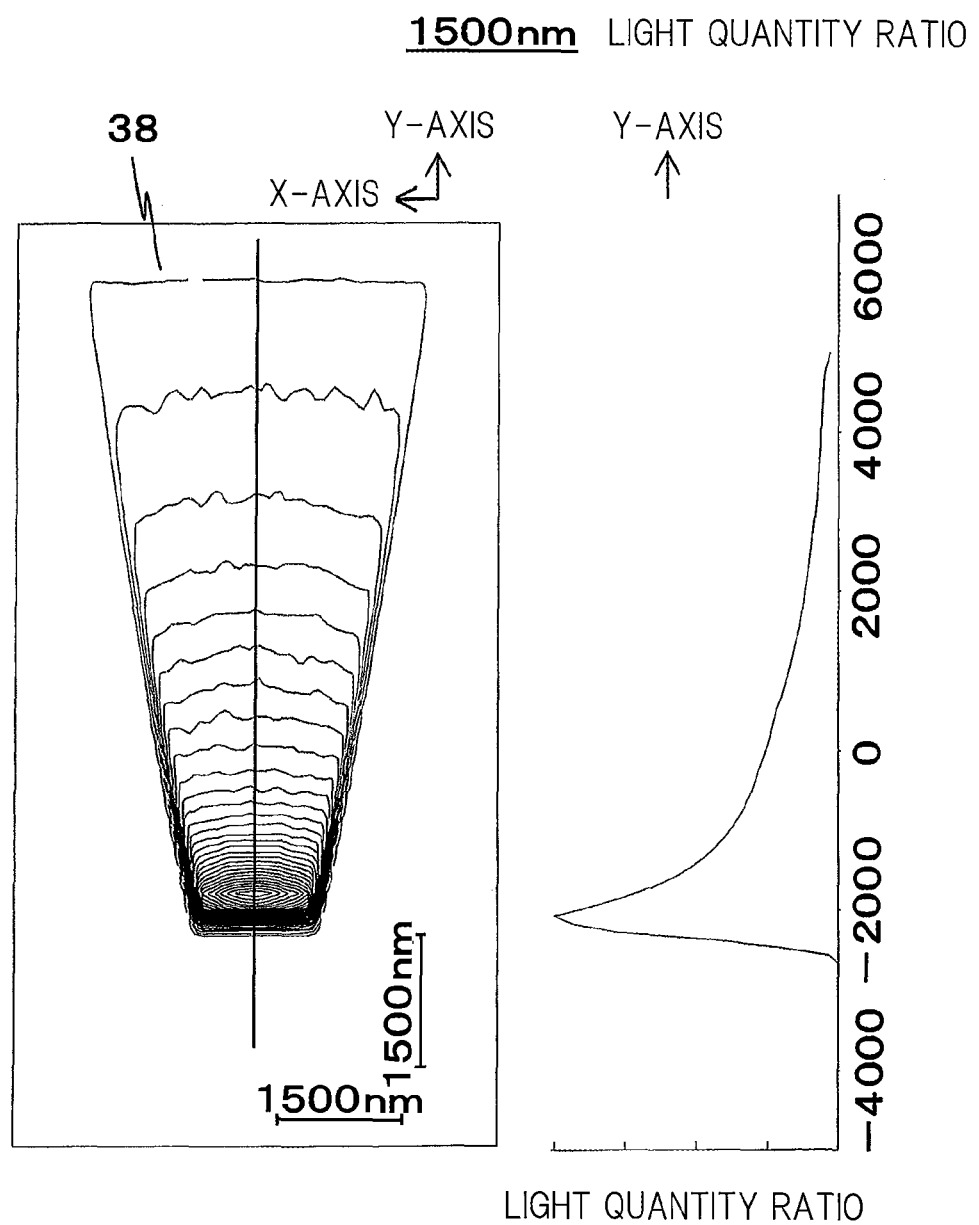
FIG. 19 is a view showing a light quantity distribution on an image plane in the projection optical system of above Embodiment 2.
Figure 20:
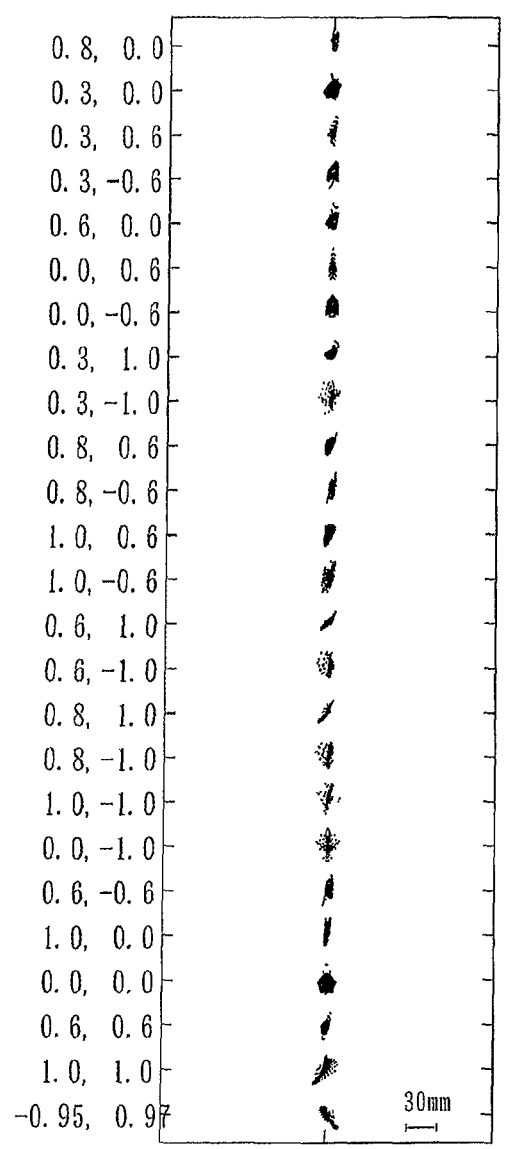
FIG. 20 is a spot view showing spot sizes formed by the projection optical system of above Embodiment 2.

As optical performance of Embodiment 2, FIG. 18, FIG. 19, and FIG. 20 show distortion performance, light quantity distribution diagrams on an image plane, and spot sizes, respectively.

FIG. 18 depicts an aberration of lens distortion, and is a view showing coordinates on an image plane of main beams of light, which are emitted from respective points of intersection of the image display element 25 by dividing an image display range of the image display element 25 into 9 segments in a horizontal direction (X-axis in Figure) and into 16 segments in a vertical direction (Y-axis in Figure). A size along the X-axis of the projected image on its side closer to the head light apparatus is 1502 mm, and a size along the X-axis of the projected image on its side further from the head light apparatus is 5317 mm. This gives a size difference along the X-axis of 5317/1502=3.5, indicating that the projected image is expanded into a substantially trapezoidal shape. A viewing angle calculated by dividing the size along the X-axis by the distance from eyes of a driver will then be described.

If a distance from the head light apparatus to the driver's eyes is assumed to be 2 m and is added to a distance in the Y-axis direction from the head light apparatus to the image plane of 542 to 10061 mm shown in FIG. 13, a calculation result of 2542 to 12061 mm is yielded. The viewing angle at the location of the driver's eyes is, therefore, calculated at $\tan^{-1}(1502/2542)=31$ degrees and $\tan^{-1}(5317/12061)=24$ degrees. This means that the projected image gives the 3.5-time size difference along the X-axis, while the viewing angle from the driver's eyes is a range of 31 to 24 degrees and yields only the 1.3-time size difference.

Also in a light Quantity distribution chart of FIG. 19, for the same reason for creation of the size difference along the X-axis, the light quantity on the side closer to the head light apparatus is large, while the light quantity on the side further from the head light apparatus is small. The light quantity difference is, however, small similarly to the viewing angle difference.

FIG. 20 depicts spot sizes on the image planes that result from arranging 25 object points on one side of the image display element 25. If the trapezoidal projected image is defined by image sizes, it corresponds to a size of 398 inches by which the size of the projected image is defined with a size along the Y-axis of 9520 mm and with an average of 3410 mm of the maximum and minimum sizes along the X-axis. Namely, a scale 30 mm indicated on a spot size chart of FIG. 20 is equivalent to 0.3% of 398 inches, and this demonstrates that the preferable spot size is achieved.

The Y-axial size of 9520 mm and the average of 3410 mm of the maximum and minimum X-axial sizes give an aspect ratio of the whole projected image range of 9520/3410=2.8, thereby indicating that the projected image is widely elongated vertically.

Since this projection optical system is bilaterally symmetrical (symmetrical with respect to the Y-axis), the image display element 25 corresponds to an arrangement of 45 object points in total.

According to Embodiment 2, a length of a long side of the projection image range is 9520 mm relative to the projection distance of 700 mm. Therefore, a throw ratio is 700/9520=0.07, thereby achieving wide-angle projection never achieved before.

Embodiment 3

Thirdly, another embodiment (Embodiment 3) according to the present invention will be explained below by referring to the accompanying FIG. 21. Embodiment 3 is a vehicular lighting apparatus for projecting images onto a road surface similarly to Embodiment 2.

A definition of the aspect ratio of a displayed image will be explained. Since a projected image is displayed on the road, vertical and horizontal sizes of the projected image vary depending on from which direction the projected image is observed. When only a part of an image display range is illuminated, the vertical and horizontal sizes of the apparent projected image also vary.

For this reason, the aspect ratio of the projected image seen from the driver is defined as the following:

[Aspect ratio]=[Vertical size of projected image seen from driver]/[Horizontal size of projected image seen from driver].

Figure 21:
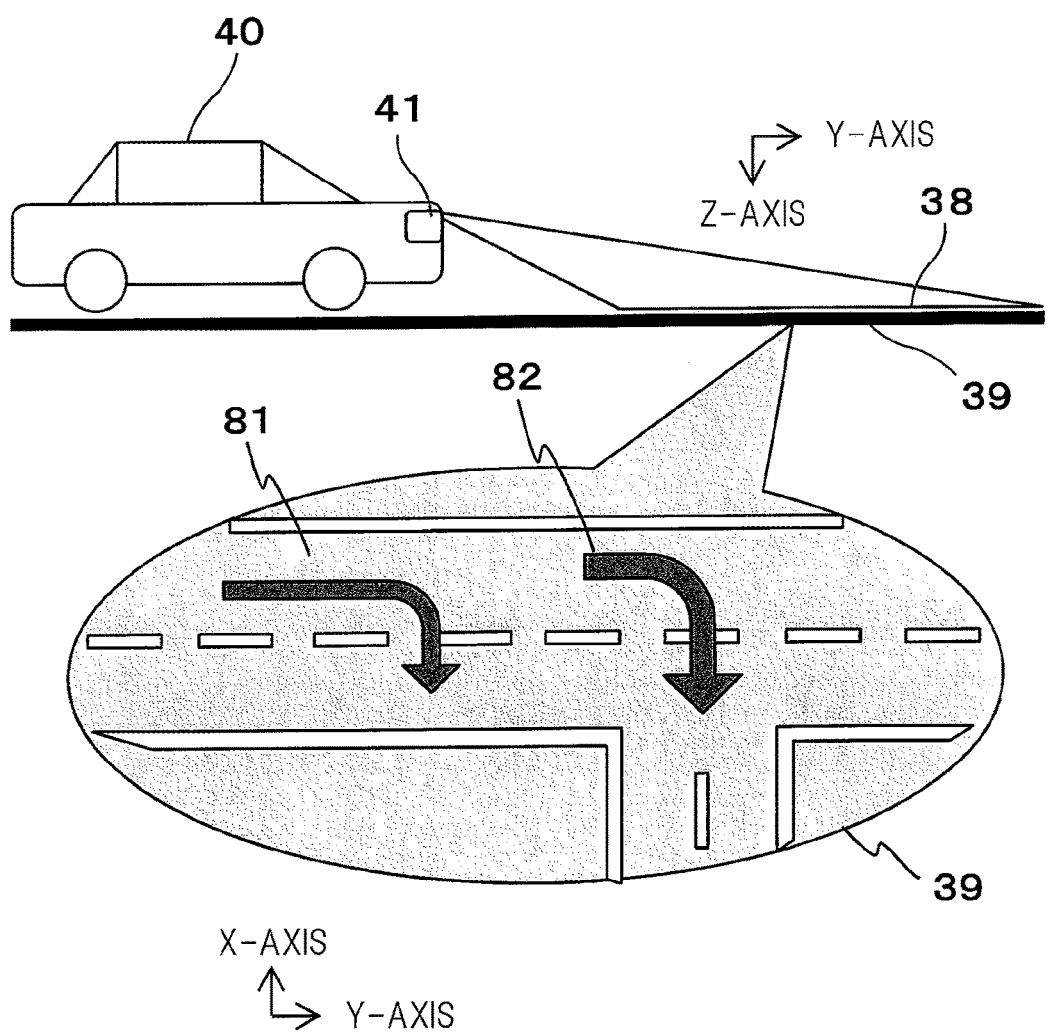
FIG. 21 is a view for explaining yet another embodiment (Embodiment 3) according to the present invention.

In FIG. 21, when each arrow bent to right is projected as a projected image of a right-turn indication, based on an instruction from the driver, the arrow with an aspect ratio of vertical elongation is displayed as a displayed image that is easily recognized by the driver. This is done for the same reason for elongating vertically a speed limit sign drawn on the road such as "60".

When the vehicle with this setup approaches a right-turn intersection etc. on this condition, the driver drops the speed of the vehicle. In response to this speed change of the vehicle, the aspect ratio of the projected image is reduced, as indicated by the displayed image. This reason is that: when the vehicle turns right at the intersection, allowing an oncoming vehicle from the right-turning side ahead and a pedestrian walking across a crosswalk to know the presence of the vehicle that is about to make the right turn is effective for preventing traffic accidents; and an indication readily recognizable to the driver of the oncoming vehicle and the pedestrian is displayed.

Simultaneously with change of the aspect ratio of the projected image, changing an image color of the right turn indication to a highly recognizable color, such as red, or blinking the projected image is also effective. In this Figure, reference numeral 40 denotes an automobile; reference numeral 41 denotes a head light; reference numeral 38 denotes illumination light; reference numeral 39 denotes a road surface and illumination light projected thereon; and reference numerals 81 and 82 denote indications (arrows) on the road surface, which are an image 1 and an image 2 projected on the road surface, respectively.

Embodiments of the present invention have been described in detail above. However, the present invention is not limited to the above Embodiments and may include various modifications. For example, the above Embodiments give the detailed descriptions of the vehicular lighting apparatus as a whole to help in understanding the present invention, and are not necessarily limited to the Embodiments including every constituent elements described above. Some of constituent elements of one embodiment may be replaced with constituent elements of another embodiment, and a constituent element of one embodiment may be added to a constituent element of another embodiment. Some of constituent elements of each embodiment may be deleted or replaced with other constituent elements or have other constituent elements added thereto.

EXPLANATION OF SYMBOL

101 . . . composite light; 1 . . . reflection mirror; 2-1, 2-2 . . . light source; 3 . . . composite lens element (light guide element); 3-1,3-2,3-3 . . . diffraction granting; 3-4 . . . (V-shaped groove) reflection surface; 3-5 . . . light diffusion portion; 4 . . . lens; 5 . . . planar light source; 5-1,5-2 . . . composite light source; 5-4 . . . light guide; 25 . . . image display element; 26 . . . filter; 22 . . . coaxial lens system; 23 . . . free-curved surface lens; and 24 . . . free-curved mirror

The invention claimed is:

1. A vehicular lighting apparatus attachable to a front end part of a vehicle, comprising:
   a light guide element constructed by molding a translucent resin into a shape of a polyhedron that includes a tapered light guide section with a quadrangular pyramidal trapezoid shape;
   a planar light-emitting unit that emits illumination light;
   an optical system that transforms planar light from the light-emitting unit into non-circular light and that causes the non-circular light to be incident on a first side face of the light guide element;
   a lens formed on the first side face of the light guide element on which the non-circular light is incident, wherein the lens condenses the non-circular light; and
   a plurality of light diffusion portions that are formed on a second side face of the light guide element,
   wherein the light condensed by the lens is emitted, onto a road surface in front of the vehicle, from the second side face opposite to the first side face of the light guide element.

2. The vehicular lighting apparatus according to claim 1, wherein the lens is a diffraction grating formed on the first side face of the light guide element.

3. The vehicular lighting apparatus according to claim 1, further comprising a semiconductor light-emitting element attached to one end face different from the first side face and the second side face of the light guide element,
   wherein light emitted from the semiconductor light-emitting element is guided into the light guide element and is emitted outside from vicinity of the one end face of the light guide element.

4. The vehicular lighting apparatus according to claim 1, further comprising a different semiconductor light-emitting element attached to one end face different from the first side face and the second side face of the light guide element,
wherein light emitted from the different semiconductor light-emitting element is guided into the light guide element and is emitted outside from the second side face of the light guide element.

5. The vehicular lighting apparatus according to claim 1, further comprising a semiconductor light-emitting element and a different semiconductor light-emitting element that are attached to one end face different from the first side face and the second side face of the light guide element,
wherein light emitted from the semiconductor light-emitting element is guided into the light guide element and is emitted outside from vicinity of the one end face of the light guide element, and
light emitted from the different semiconductor light-emitting element is guided into the light guide element and is emitted outside from the second side face of the light guide element.

6. The vehicular lighting apparatus according to claim 5, wherein the light guide element has a groove formed near the one end face to which the semiconductor light-emitting element and the different semiconductor light-emitting element are attached, the groove separating beams of light from respective semiconductor light-emitting elements.

7. The vehicular lighting apparatus according to claim 1, wherein the planar light-emitting unit comprises at least one or more composite light sources arranged in a planar manner, each composite light source being composed of a plurality of semiconductor light-emitting elements.

8. The vehicular lighting apparatus according to claim 7, wherein the at least one or more composite light sources are switched selectively.

9. The vehicular lighting apparatus according to claim 7, wherein the light guide is provided in each of the plurality of semiconductor light-emitting elements of the one or more composite light sources making up the planar light-emitting unit.

10. The vehicular lighting apparatus according to claim 1, wherein the optical system includes at least one of a lens condensing light from the planar light-emitting unit and a reflection mirror having a curved reflection surface.

11. The vehicular lighting apparatus according to claim 1, wherein the optical system further includes an image display element, and projects an image created by the image display element onto a location in front of the vehicle.

* * * * *